(12) United States Patent
Shuster

(10) Patent No.: US 8,490,004 B2
(45) Date of Patent: Jul. 16, 2013

(54) EVALUATION OF REMOTE USER ATTRIBUTES IN A SOCIAL NETWORKING ENVIRONMENT

(76) Inventor: Gary Stephen Shuster, Fresno, CA (US)

( * ) Notice: Subject to any disclaimer, the term of this patent is extended or adjusted under 35 U.S.C. 154(b) by 549 days.

(21) Appl. No.: 12/426,138

(22) Filed: Apr. 17, 2009

(65) Prior Publication Data

US 2009/0265639 A1  Oct. 22, 2009

Related U.S. Application Data

(60) Provisional application No. 61/045,728, filed on Apr. 17, 2008.

(51) Int. Cl.
*G06F 3/00* (2006.01)

(52) U.S. Cl.
USPC .......................................... 715/760; 715/747

(58) Field of Classification Search
USPC ........................................................ 715/760
See application file for complete search history.

(56) References Cited

U.S. PATENT DOCUMENTS

| | | |
|---|---|---|
| 2001/0047347 A1 | 11/2001 | Perell et al. |
| 2005/0071417 A1* | 3/2005 | Taylor et al. ............... 709/200 |
| 2006/0010487 A1* | 1/2006 | Fierer et al. .................. 726/5 |
| 2006/0173838 A1 | 8/2006 | Garg et al. |
| 2006/0247940 A1 | 11/2006 | Zhu et al. |
| 2007/0032240 A1 | 2/2007 | Finnegan et al. |
| 2007/0061881 A1 | 3/2007 | Eyre |
| 2007/0192106 A1 | 8/2007 | Zilea |
| 2008/0059217 A1 | 3/2008 | Austin et al. |
| 2008/0059447 A1* | 3/2008 | Winner et al. ................ 707/5 |
| 2008/0059453 A1* | 3/2008 | Laderman ...................... 707/5 |
| 2008/0059576 A1 | 3/2008 | Liu et al. |
| 2008/0059580 A1* | 3/2008 | Kalinowski et al. .......... 709/204 |
| 2008/0086319 A1 | 4/2008 | Berger |
| 2008/0090598 A1 | 4/2008 | Fanelli et al. |

* cited by examiner

*Primary Examiner* — William Bashore
*Assistant Examiner* — Hien Duong
(74) *Attorney, Agent, or Firm* — Novak Druce Connolly Bove + Quigg LLP; Jonathan A. Jaech

(57) ABSTRACT

A computer host is configured to perform a method for defining user attributes with associated verification values for social networking accounts. The attributes concern the user's personal characteristics or attributes. The host publishes the attribute information to other clients together with interactive objects for soliciting corroboration of the attribute information. The host receives feedback information from other account holders, such as survey response data, concerning the veracity of the attribute information. The host processes the evaluation information and the feedback information to provide a veracity score of each attribute reported for each account holder, or for collections of attributes, by weighing the evaluation information and feedback information by a computed reliability factor for each source from which processed information is obtained.

14 Claims, 5 Drawing Sheets

---

300

John Smith

Verification Score Overall: 73.3%

John has Provided One (1) Identity Document, and has Received Verification Rating from Five (5) Independent User Sources. Our Host Estimate of Reliability for John's User Information is as Follows:

Scores (% Certainty)

| | |
|---|---|
| Name: John Smith | 85% |
| Age: 15 | 85% |
| Sex: Male | 85% |
| Weight: 145 lbs | 59% |
| Height: 5' 6" | 70% |
| Hair Color: Blonde | 65% |
| Etc. | |

⎬ 302

WARNING: Host does not Warranty Accuracy of any Information for John Smith.

Would You Like to Provide Feedback? [YES] [NO]

John Smith User Profile

Do you know John Smith?

| | True | False | Don't Know |
|---|---|---|---|
| Age: 15 | ☐ | ☐ | ☐ |
| Sex: Male | ☐ | ☐ | ☐ |
| Weight: 145 lbs | ☐ | ☐ | ☐ |
| Height: ... | ☐ | ☐ | ☐ |
| Hair Color: ... | ☐ | ☐ | ☐ |
| Etc. | | | |

John Smith

Verification Score Overall: 73.3%

John has Provided One (1) Identity Document, and has Received Verification Rating from Five (5) Independent User Sources. Our Host Estimate of Reliability for John's User Information is as Follows:

Scores (% Certainty)

| | |
|---|---|
| Name: John Smith | 85% |
| Age: 15 | 85% |
| Sex: Male | 85% |
| Weight: 145 lbs | 59% |
| Height: 5' 6" | 70% |
| Hair Color: Blonde | 65% |
| Etc. | |

}—302

WARNING: Host does not Warranty Accuracy of any Information for John Smith.

Would You Like to Provide Feedback?  YES  NO

FIG. 3

EVALUATION OF REMOTE USER ATTRIBUTES IN A SOCIAL NETWORKING ENVIRONMENT

CROSS-REFERENCE TO RELATED APPLICATION

This application claims priority pursuant to 35 U.S.C. §119(e) to U.S. provisional application Ser. No. 61/045,728, filed Apr. 17, 2008, which is hereby incorporated by reference, in its entirety.

BACKGROUND

1. Field

This application relates to evaluation of remote user attributes in a social networking environment.

2. Description of Related Art

Socializing on the Internet is a common activity in today's wired society. Many people including both children and adults participate in some form of online social networking. Social networking may take the form of massively multiplayer online game, social websites such as LinkedIn®, Facebook®, and MySpace®, or any public site where there are interactions among users. Such sites may include sites relating to dating, blogging, and video sharing.

Regardless of the form of social networking, most sites or systems allow users to sign up as members. The identities of the members are often verified using credit cards or other methods involving third-party authenticators using personal confidential information provided by respective users. With or without some form of third-party verification, a user's personal characteristics may not be verified, therefore enabling some users to falsely portray their own personal characteristics, for example, age, gender, geographic location, occupation, education, or group membership. Additionally, most social networking sites that cater to children lack any form of requirement for identification. Thus, an adult may falsely portray himself as a minor on such websites. This example exemplifies the inherent danger of online networking, especially for children. In other circumstances, false portrayals may be more annoying than dangerous, but nonetheless tend to undermine and devalue the worth of online social networks. This is especially true of dating or other networks in which online activity may serve as a prelude to an in-person relationship. At the same, use of third-party authentication with personal confidential information, besides not enabling verification of all personal attributes, may not be economically practicable, because many users are justifiably reluctant to submit personal confidential information to administrators of social networking sites.

As social networking web sites, virtual worlds, dating web sites, and other network based applications increasingly serve as a proxy for face to face human interaction, the importance of evaluating the accuracy of personal attributes ascribed to remote users has dramatically increased. As unthinkable as it is for a parent to imagine that a 50 year old man might be posing as a 14 year old girl in order to interact with children, such is the reality of social networking. At the same time, there is a demand for social networking sites that allow members to join without providing verified or verifiable personal information, because members desire to minimize risks of identity theft that may result from freely providing too much personal information, or because verification costs raise unacceptable barriers to entry. Existing technology fails to provide verification or a risk profile that to enable persons accessing a social network to determine the likelihood that people they are interacting with actually have claimed personal attributes, such as, for example, the claimed age, hair color, eye color, height, weight, gender, profession and geographical location.

SUMMARY

According to various embodiments of the invention, systems and methods for verifying user personal characteristics are provided. The method includes: receiving from a first user on a social network personal information about the first user; requesting veracity feedback of one or more items of personal information of the first user from a plurality of users on the social network; assigning a confidence score (also called a veracity score) to each item of personal information based on respective veracity feedback provided by one or more of the plurality of users; and publishing, on the social network, the confidence score of the first user's personal information to one or more users of the social network. The method may be performed by a computer in communication with a plurality of clients and running application software to perform the recited actions.

The method may further include one or more of the following: determining an physical-IP location of the first user based on the first user's IP address; comparing the physical-IP location with a location information provided by the first user; and determining a confidence score for the location information of the first user based on the comparison. The confidence score can be based on multiples comparisons of a plurality physical-IP location determined at different times. In this way, the user's main location can be determined and used as a comparison to what is being purported as the user's actual location.

In one embodiment, the method may include the procedure of assigning the confidence score using veracity feedback from different users. Thus, a confidence score of a single piece of information may depend on various users' inputs. If a substantial number of users provide the same answer or ranking to particular personal information, then the confidence score for such personal information may be increased. In another embodiment, the method may include: verifying a first item of personal information such as sex and age of the first user via an interactive voice chat or video session; and assigning a confidence score for the personal information of the first user based on the interactive session. For example, the method may verify age information of the first user via an interactive video session. Subsequently, the method may adjust the confidence score of the age information of the first user based on veracity feedback from an evaluating user after the interactive video session. Additionally, a reliability score, based feedback after the interactive video session, for each of the plurality of users that provided veracity feedback on the personal information can also be assigned. For example, if user 'A' verified that the user's age is over 21 and a video session confirms an older gentlemen, then the reliability score of user 'A' may be increased in response to user 'A' providing reliable information consistent with the video session. Conversely, if the video session shows a young child, then the reliability score of user 'A' may be decreased in response to the inconsistent information. In yet another embodiment, the method may include adjusting the confidence score of the personal information based on a pre-established reliability score of a user that provided the ranking for the personal information.

According to yet another embodiment of the present invention, a computer readable medium having stored thereon computer executable instructions that, if executed by a computer, cause the computer to perform: receiving from a first user on a social network items of personal information about the first user; requesting a plurality of users on the social network to provide to a server veracity feedback concerning one or more of the items of personal information of the first user; assigning a confidence score to each personal information having respective veracity feedback provided by one or more of the plurality of users; and publishing, on the social network, the confidence score of the first user's items of personal information to one or more users of the social network.

In some embodiments, a computer server or host for a social networking site may be configured to perform a method for defining user attributes with associated verification values for social networking accounts. The host computer may receive user attribute information from clients, wherein each user attribute is provided by an identified account holder. The attributes may concern the user's personal characteristics or attributes, for example, age, gender, geographical location, profession, educational level or group membership. The host computer may store the attributes as associated with the respective account holders providing the attribute information. The host may publish the attribute information to other clients together with interactive objects for soliciting corroboration of the attribute information.

In addition, or in the alternative, requests for corroboration from the account holder providing the information to be corroborated may be forwarded by the host to host agents for performing expert corroboration services such as ID document checking and remote interviewing. The host may receive evaluation information from the agents responsive to the forwarded requests and store the evaluation information in a database.

In addition, the host may receive feedback information from other account holders, such as survey response data, concerning the veracity of the attribute information. The feedback information may be weighted by a pre-determined reliability factor for each account holder that provides feedback. The host may store the feedback information with the evaluation information.

The host may process the evaluation information, the feedback information, or both to provide a veracity score of each attribute reported for each account holder, or for collections of such attributes, by weighing the evaluation information and feedback information by the predetermined reliability factor for each source from which processed information is obtained. The veracity score may express an estimated level of truth for the reported attributes, which may range anywhere within the range of 0% to 100%. The host computer may report the veracity score to requesting clients so as to provide a score for each reported attribute. The host may report different veracity scores for different attributes. For example, the host may report an 80% veracity score for an attribute describing a user's gender, while reporting a 20% veracity score of an attribute describing a user's age. Such differences may generally arise through differences in feedback from other account holders, differences in amount of feedback received for different information items, and by differences in reliability factors for users providing the feedback.

In some embodiments, agents providing evaluation information are not employed by the host to develop a veracity score, and feedback information from other account holder is relied on exclusively for this purpose. In such embodiments, it may seem more difficult to obtain veracity scores that are high enough to be useful. Chronically or consistently low veracity scores for all items in a database are of little use because they merely inform users that information on a site is generally not very reliable. What is desired is to assist users in discriminating between more reliable and less reliable information, to reward users that provide accurate information about themselves and others, and to thereby gradually build up more reliable information about members of a site. Surprisingly, a system that does not use trusted evaluation agents or personal confidential information may be able to achieve useful veracity scores merely by requesting and processing feedback from other users of the system. That this is so may be understood in view of the accompanying detailed description.

A more complete understanding of the method and system for distant evaluation of personal attributes in a social networking environment will be realized by one of ordinary skill in the art, as well as a realization of additional advantages and objects thereof, by considering the following detailed description. Reference will be made to the appended sheets of drawings, which will first be described briefly.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

FIG. 2 is a simplified screenshot showing an example of an interactive survey for collecting veracity feedback data from users evaluating personal attributes of other users.

FIG. 3 is a simplified screenshot showing an example of a confidence or veracity score concerning a user's personal attributes, based on veracity feedback data from other users.

DETAILED DESCRIPTION OF VARIOUS EMBODIMENTS

Figure 1:
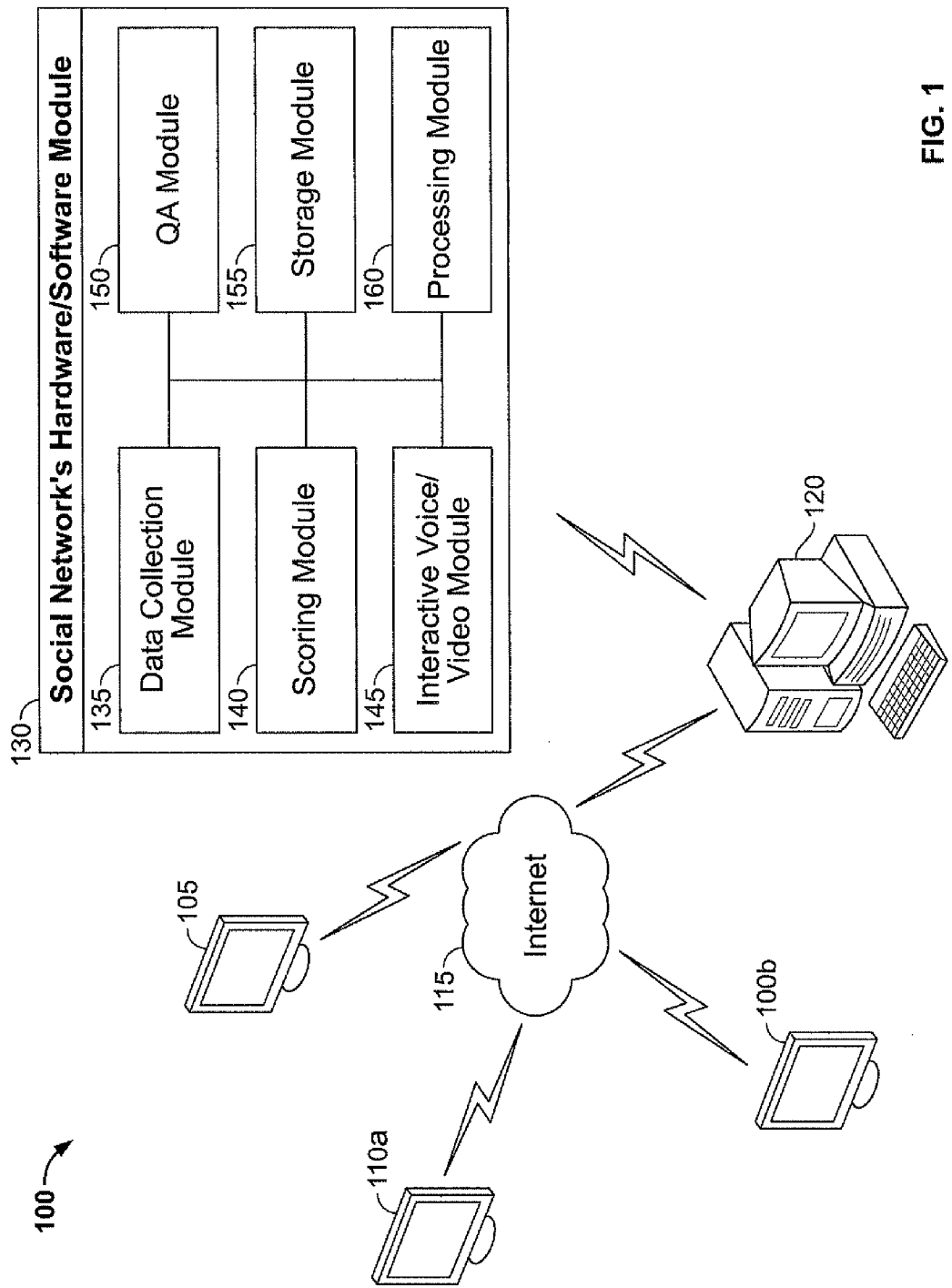
FIG. 1 is a schematic diagram showing an example environment for implementing confidence evaluation of personal attributes in an online social networking system.

The methods disclosed herein may be performed by a computer specially configured through suitable programming and auxiliary components to perform the functions described herein. Environment 100, as diagrammed in FIG. 1, may comprise a client 105 and clients 110a-b in communication with each other via a social network application operating on a host computer 120. A social network application may perform any form of social networking in an online computer environment, including but not limited to a massively multiplayer online game, a dating site, a friendship or shared interests site that publishes personal attribute information about its members, or other networking site facilitating interactions between its members for the purpose of social networking. To determine whether or not information received from client 105 and purporting to describe a user is misrepresenting any personal attributes or information of the user, or whether or not the user is accurately portraying personal characteristics on the network, the methods described herein may be implemented on the host 120. In environment 100, clients 110a-b may be in use by individual users on the same social network that either know user 105 personally, or have interacted with the user via the networking site.

Environment 100 may also include a network 115, a host computer 120, and a hardware/software module 130 operatively associated with the host computer. Host computer 120 for a social network may be configured to use a combination of direct evaluation and group evaluation to determine a risk profile of any single user in response to veracity feedback from one or more other users of the social networking application. The risk profile may be provided by the host computer to remote clients to enable end users to determine a relative likelihood that other users have truthfully portrayed themselves online. Host computer 120 may communicate with a plurality of remote clients 110 via network 115, such as the Internet. Host computer 120 may generate and maintain user accounts as known for host sites of numerous types, and facilitate communication between registered and/or unregistered users by hosting user-configurable pages or other data that is made available to other users, using instant messaging, chat applications, and other tools commonly employed on social networking and other computer sites. An individual user may communicate with the host using one more different clients.

Each user account registered with host computer 120 may be associate with personal attribute information provided by each respective user. Personal attribute information may be divided into data items or data fields, each purporting to describe a different characteristic of the user. Using the methods described herein according to programmed instructions, the host computer may determine a veracity score for each item of personal attribute information. The veracity scores may be maintained and updated in a memory or data storage component 108 in communication with host computer 120. Host computer 120 may compute the veracity scores in various suitable ways. In one embodiment, the veracity score may be computed on a single scale (e.g., zero to 100) relating to all of the data available for each user account. Alternatively, more than one point scale is utilized, with each point scale representing one or more related traits. For example, hair color, eye color, height and weight might be an "appearance" scale, while age would be its own "age" scale.

For further example, verification scales may be defined using a 100 point scale that reflects the percentage certainty of the validity of the information. For example, a score of 50 may indicate an estimated 50% confidence in a data attribute. As described in more detail below, algorithms used for assigning veracity scores may require periodic validation and calibration. Host computer 120 running the scoring algorithms may accumulate data regarding personal attributes from various different sources, and assign scores based on identity of the source. Data from sources known to be reliable, or having a good history of reliability, may be assigned a veracity score consistent with an estimated level of confidence in the source and the source's own stated degree of confidence.

For example, a registered administrator, "data checker," or other impartial users 110 in communication with the host site may independently verify account attribute data. When host 120 receives an indication that data has been verified by a known agent, host 120 may assign a high reliability score to such data. However, verification by agents under contract to the host site is generally not preferred, because of associated costs, inconvenience to users, and resistance from users reluctant to participate in a formal verification process for various reasons. It may be preferable to draw on an established user base and existing published data as alternative verification sources. In particular, verification by other users may be an important source of verification score adjustment. Published network data may comprise another verification source.

Host computer 120 may include a software/hardware module 130 to execute one or more functions of host computer 120 described above. Module 130 may include a data collection module 135, a scoring module 140, an interactive voice/video module 145, a quality assurance module 150, a storage module 155, and a processing module 160. Data collection module may be configured to gather personal attribute data from user 105 and to gather veracity feedback data from users 110. Scoring module 140 may be configured to compare personal attribute data provided by a user operating a client 105 with veracity feedback on personal attributes of the user provided by one or more independent users operating unrelated client 110.

Interactive voice and/or video module 145 may be configured to perform or provide interactive voice and/or video session between any user providing personal information purported to describe herself and an independent evaluator, to verify certain personal attributes of that user. Attributes that may be verified using an interactive session may include, for example, estimation of age and gender. Interactive module 145 may be automated using automatic voice and facial features recognition software; in other words, the independent evaluator may comprise a machine. In the alternative, or in addition, the independent evaluator may comprise a human operator, such as another user. Data gathered by interactive module 145 may be stored in a memory or in storage module 155.

QA module 150 may be configured to use data gathered by interactive module 145 to assign reliability scores to one or more users that have provided veracity feedback on one or more personal attributes of another user. The reliability score may depend on whether the user providing feedback has been accurate in providing the veracity feedback on various personal attributes of the evaluated user, as determined by agreement with feedback from other users. For example, if feedback from one user often conflicts with feedback from numerous unrelated users, then the reliability score for the user with inconsistent feedback may be relatively low. Conversely, QA module 150 may assign a higher reliability scores to users that are consistently in agreement with feedback from unrelated users or from other trusted sources.

Each of modules 135-160 may contain necessary instruction for processing module 160 to assist each of modules 135-160 to execute its respective functions described above. Additionally, all functionalities of module 130 (which include modules 135-160) may be executed by host computer 120. Alternatively, software/hardware module 130 may be separated or integrated with host computer 120.

Referring now to FIG. 2, an example of verifying data according to one embodiment of the present invention is illustrated. A user profile 200 may be given in the context of a social networking site similar to myspace.com, but it is not limited to social networking. For simplicity of example, user 105 may input only 3 data points: age, gender, and location of residence. For example, a user John Smith signs up and claims to be a 15 year old male from Los Angeles. Utilizing a geo-IP database (such as that commercially available from MaxMind), host computer may automatically check John Smith's IP address each time he logs in. If that IP address frequently matches those in the Los Angeles area, the host may increase the veracity score for the stated residence. If the "John Smith" account is frequently accessed from a point outside of the Los Angeles area, the host may decrease the location verification rating.

For further example, host computer 120 may solicit and accept input from other users regarding reliability of Smith's claimed attributes. For example, host computer may serve a veracity feedback page 200 for John Smith to any user that requests it, as shown in FIG. 2. The veracity feedback page 200 may include one or more interactive graphical objects 202 for receiving feedback from a user viewing the page, such as checkboxes or the like. In the alternative, a pop-up window may appear with the profile page, asking the viewer to provide feedback regarding the profile data, with the options "I can't verify anything" or "I can verify something." If the user selects "I can't verify anything" the host may record the input cumulative to a count of users for whom "John Smith" is not known. Conversely, if the user selects "I can verify something," the host may serve another window similar to window 200 soliciting the user's survey responses for reliability of the listed attribute data. If the user provides the data, the host may store the feedback in a data base of user reliability feedback data and use the stored data in generating reliability ratings for one or more attributes. An account's ratio of "stranger" responses to "known" responses, or total number of "known" responses, may also be a factored into reliability ratings. To provide incentives to other users to respond to host feedback surveys, the host may increase a veracity indicator assigned to user accounts, in positive response to useful feedback received from the user. This may encourage users to provide accurate information not only about themselves, but also feedback concerning other users, thereby boosting their own veracity scores.

While such verification has the potential for individual or collusive fraud, such potential may be controlled using various methods. For example, host 120 may weigh the rating value of verification data received from non-agent sources in accordance with a veracity source score assigned to the verifying party. Therefore, verification data received from users that are not themselves verified, or that have low veracity source scores, may receive relatively less weight in computing a veracity score for other users than verification data from sources with high veracity scores. Host 120 may also refuse to accept multiple ratings for the same user account received from the same physical client, to discourage users from creating additional accounts and using those additional accounts to verify other accounts. Still further, host 120 may analyze patterns of how verification data is received from multiple sources to detect any patterns that indicate collusion or fraud. For example, if host 120 detects that a particular user account is verified by other accounts who have not verified each other and use distinct clients, this might indicate that the verification data has been received from unrelated parties that do not frequently interact. Such data might be weighted more highly as being less likely to be a product of collusion.

Host 120 may optionally provide "John Smith" an option to immediately raise his veracity source score, by providing documentary proof of gender and age to the system administrator. For example, using a link on a verification page served by host 120, the user may be prompted to email a scanned copy of his identification documents or sign up for an interview via web cam. When host 120 receives identification documents for an account, host 120 may automatically route the document to an agent specifically contracted to examine and report an estimate of document reliability. In response to receiving the identification document, the agent may provide an authenticity score to host 120, for example, a grayscale image of a colored ID document may be assigned a lower score than a color image, and so forth. The agent may also compare an age or other attribute stated on the document and report the value of the attribute to the host. The information provided by the agent may be stored in the scoring database and used together with user-supplied data or data available from other network sources to compute a veracity score.

Likewise, host 120 may receive a request to submit a webcam interview from a client 104 using an attached video camera and microphone 112. Host 120 may route the request to agent 110 or another agent specializing in conducting verification interviews. That agent may send an electronic message initiating a webcam interview to the client. If user 105 responds to the request, agent submits a series of questions that user 105 is required to respond to via the webcam 112. The agent evaluates the veracity of the responses and submits evaluation data after the interview is completed to host 120. The host includes the interview evaluation data in the verification data for the user.

A web page or other data object for presenting veracity scores for each user account may be generated at host 120 and populated with current veracity scores in response to user requests. For example, a client requesting verification data for the "John Smith" account may receive a verification data page 300 served from the host, as shown in FIG. 3. The veracity scores 302 may represent the host computer's most current verification estimate based on available data. These scores may be presented as a risk profile for individual data items. Attributes are not, unlike user identities, authenticated or denied as binary values. Rather, each attribute may be listed with a probabilistic estimate of certainty for the stated attribute. A relatively uncertain (low) certainty value does not imply that a stated attribute is false; rather, it means that few or no sources of high reliability have corroborated that the attribute is true or that some sources have stated it is false. Likewise, a relatively certain (high) value does not imply that a stated attribute is true. Instead, a high certainty score means that one or more sources of high reliability have corroborated that the attribute is true and that nothing reliable contradicts that conclusion.

Host 120 may further be configured to filter access to user data based on verification data. For example, the host may provide a user with an option to prevent any other user from contacting her or accessing her posted pages without first obtaining her permission, unless the requester's account has a veracity score of 70% or better, either as an average for all data items or as reliability measure for the user as an information source, as a whole, including when evaluating other users. Conversely, host 120 may provide the user with an option to avoid accessing any posted pages or communicating with unknown users having a verification value below a designated value. For example, a search page for accessing other user pages may include, among other values, a verification value setting. In response to the user setting a defined verification threshold, host 120 may screen out search results from user that fall below the designated threshold.

In summary, host 120 may be configured to perform a method for defining user attributes with associated verification values for social networking accounts. Host 120 may receive user attribute information from clients, wherein each user attribute is provided by an identified account holder. The attributes concern the user's personal characteristics or attributes. Host 120 stores the attributes as associated with the respective account holders providing the attribute information. Host 120 may serve the attribute information to other clients together with interactive objects for soliciting corroboration of the attribute information. Requests for corroboration from the account holder providing the information to be corroborated may be forwarded by host 120 to host agents for performing expert corroboration services such as ID document checking and remote interviewing. Host 120 may receive evaluation information from the agents responsive to the forwarded requests and store the evaluation information in a database or storage module 155.

In addition, or in the alternative, host 120 may receive feedback information from other account holders, such as survey response data, concerning the veracity of the attribute information. Host 120 may store the feedback information with the evaluation information. Host 120 may process the evaluation information and the feedback information to provide a veracity score of each attribute reported for each account holder, or for collections of attributes, by weighing the evaluation information and feedback information by a computed reliability factor for each source from which processed information is obtained. The veracity score correlates to an estimated level of certainty for the reported attributes. Host 120 may report the veracity score to requesting clients so as to provide a score for each reported attribute.

Figure 4:
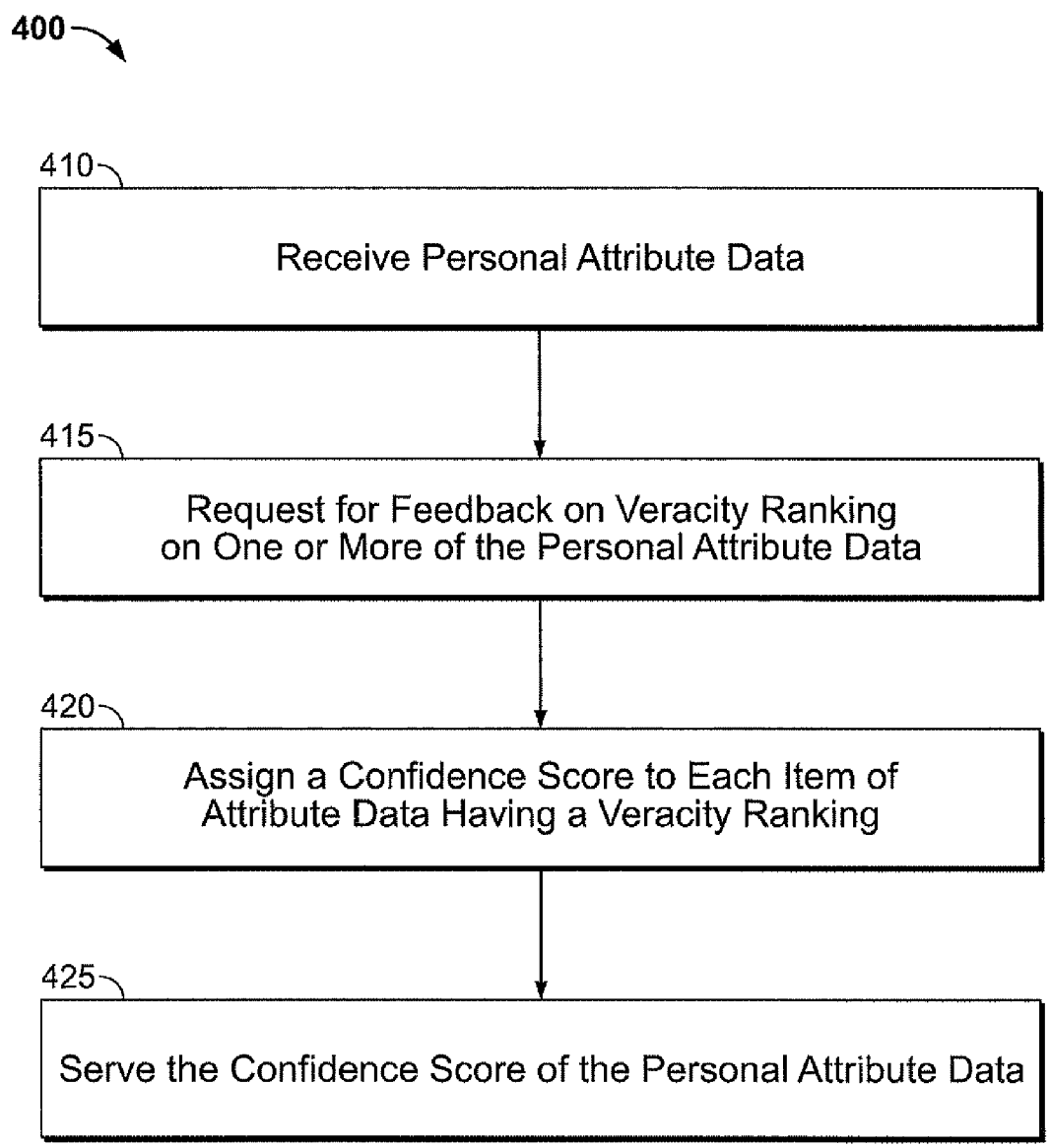
FIGS. 4-6 are flow charts showing examples of processes for verifying a user's personal attributes on a social network using veracity feedback from other members of the social network.

FIG. 4 is a flowchart illustrating a method 400 for verifying a user's personal information according to an exemplary embodiment of the present invention. Method 400 may begin at 410 by receiving personal attribute data at a host from a client via a network, pertaining to an identified user account signed in with the host via the client. At 415, the host may serve requests to other client via the social networking application, inviting or requesting veracity feedback on one or more items of the attribute data from other users. This may be done during times when other users interact with the first user originating the attribute data, by serving a pop up box similar to the text box shown in FIG. 2. Additionally, when other users interact with the first user, a pop up box similar to the text box shown in FIG. 3 may be shown.

At 420, a confidence (veracity) score may be assigned to each of the personal data that has veracity feedback associated with it. The veracity feedback may be provided by other users of the social network or by an independent information vendor. In one embodiment, the confidence score is obtained by aggregating the all of the available veracity feedback for particular personal information. At 425, the confidence score of the personal data of user 105 may be served to clients interacting via the social networking application for output at the clients.

Figure 5:
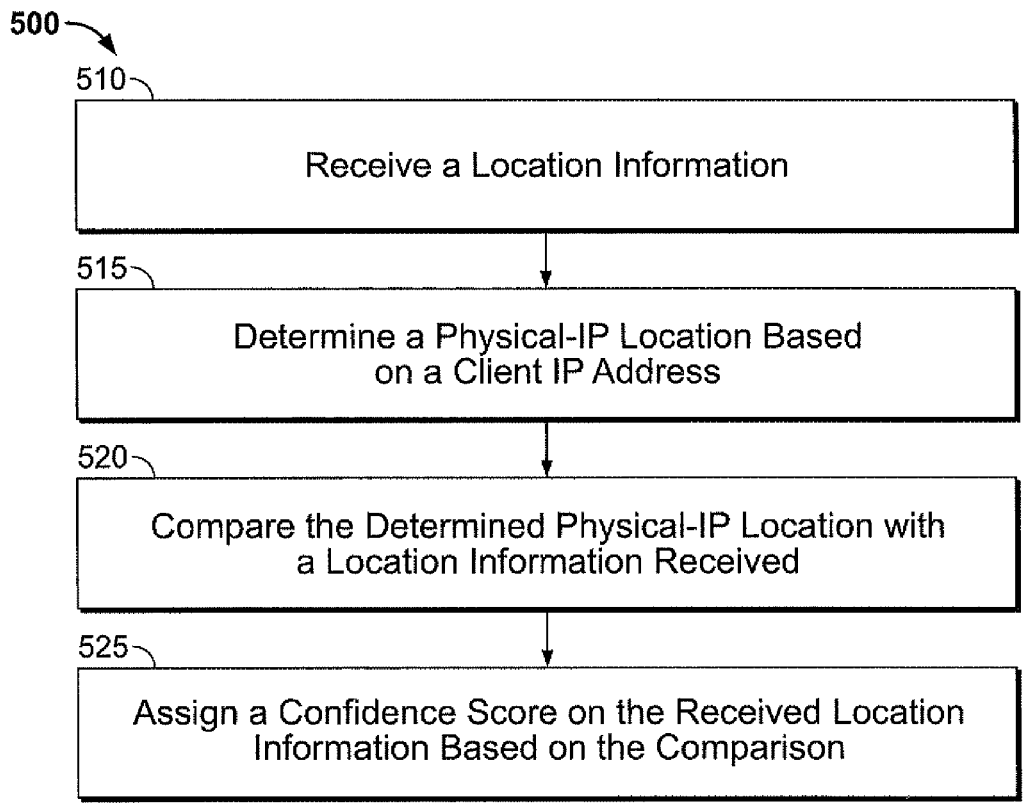

FIG. 5 is a flowchart illustrating a method 500 for verifying a user's personal data according to one embodiment of the present invention. Method 500 may begin at 510 where a random user (i.e., user 110) is allowed to voluntarily submit veracity feedback on one or more personal attributes of user 105. At 515, a physical-IP location of user 105 may be determined using the IP address of client 105. At 520, a comparison may be made between the determined physical-IP location and the location information provided by a user signed into the host via client 105. At 525, a confidence score is assigned on the location information of the user operating client 105 based on the comparison done in 520. If the provided location information matches the physical-IP location, then the confidence score may be set at a high level. Conversely, if the provided location information does not match with the physical-IP location, then the confidence score may be set at a low level.

Figure 6:
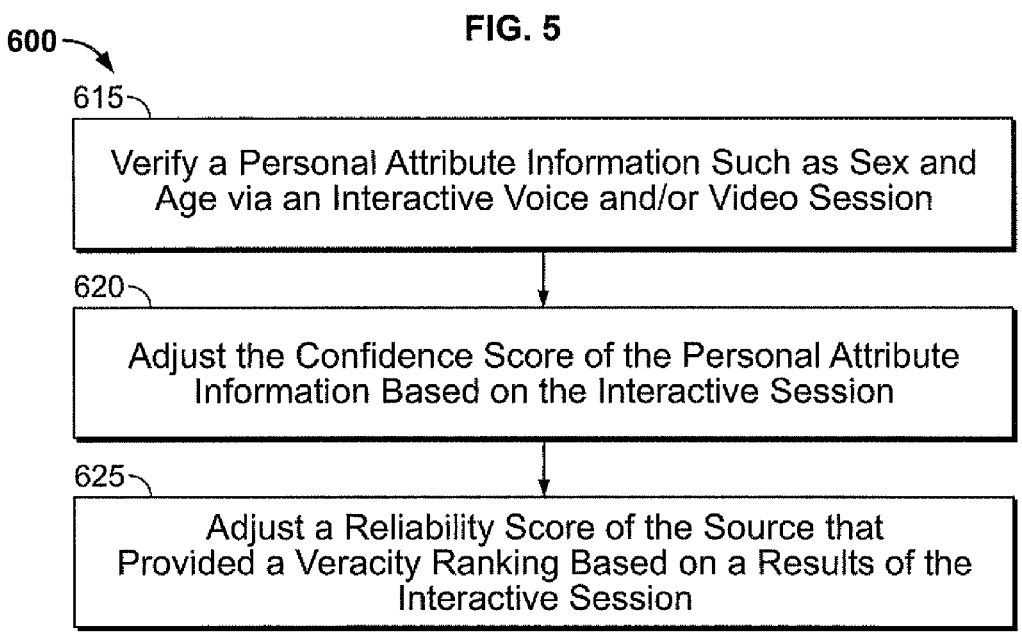

Referring now to FIG. 6, a method 600 for verifying a user's personal data according to one embodiment of the present invention is shown. Method 600 may begin at 610 where confidence scores of user's 105 personal data are based on veracity feedback collected from different users. The confidence score may be summarized in several ways such as taking the mean or the average of all the feedback. At 615, items of attribute information such as gender and age may be further verified using an interactive voice and/or video session. The interactive session may be fully automated or may be operated by an operator. Using the voice or video session, a person's sex and age may be verified. Once verified to be incorrect or correct, the veracity feedback data may be stored in storage module 155. At 620, the confidence score for the gender, age, or other personal attribute data may be determined and adjusted according to the results of the interactive session. For example, user 105 may portray himself as an 11 year old, but an interactive voice and/or video session confirms that user 105 is an adult, then the confidence score for the sex and age of user 105 may be set to very low or zero.

At 625, a reliability score may be assigned for each user that provided a feedback on user's 105 personal attributes. If the information-providing user is substantially correct with her feedback on user's 105 personal attributes, then her reliability score is increased. If however, the information-providing user is incorrect, then her reliability score may be decreased. "Correctness" cannot generally be determined as an absolute, because if the truth or falsity of an information item is absolutely known, there is no need for further veracity feedback concerning the item. Instead, "correctness" here refers to a degree of consistency with veracity feedback from other users or other sources. In one embodiment, the host may increase a veracity score of a user's personal attribute information in proportion to a reliability score for the user as a feedback source. In other words, users that provide consistent "correct" feedback concerning other users may be rewarding by receiving higher veracity scores for their own personal attribute data.

FIG. 7 diagrams elements of a host computer 700 configured for evaluating veracity of personal attributes for remote users, in accordance with the description above. Computer 700 may comprise a means 750 for receiving from a first user on a social network personal attribute data about the first user. Means 750 may comprise a processor 730 operatively associated with instructions for communicating with a remote client to receive attribute information, such as may be stored in a memory 740. Similarly, means 755 for obtaining veracity feedback concerning items of attribute information of the first user from other users may comprise the processor 730 operatively associated with the memory 740 holding program instructions for performing the recited function. Apparatus 700 may also include a means 760 for assigning a confidence score to each item of the personal data having veracity feedback provided by one or more of the plurality of users, similarly constructed. Additionally, apparatus 700 may include a means for publishing, on the social network, the confidence score of the first user's personal data to one or more users of the social network. In this way, other users will be able to see whether the information provided by the first user can be trusted or not.

As shown in FIG. 7, computer 700 may include a processor module 530 having at least one processor. Processor 730 and associated memory 740 be coupled via a bus 710 or similar communication coupling. Memory 740 may comprise a computer readable medium or memory device 740 adapted to store computer readable instructions and data for implementing the processes and functions of means 750-765. Processor 730 and memory 740 may provide essential hardware components of means 750-765, each of which may also comprise distinct software or firmware components for causing the processor to perform the described functions. For example, a software module 720 held in memory 740 may include distinct instructions for implementing the functions of 750-765.

While various embodiments have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Additionally, with regard to flow diagrams, operational descriptions and method claims, the order in which the operations are presented herein shall not mandate that various embodiments be implemented to perform the recited functionality in the same order unless the context dictates otherwise. The breadth and scope of the present invention should not be limited by any of the above-described exemplary embodiments.

The invention claimed is:

1. A method comprising:
serving personal attribute information received at a host computer from respective users of a communication service, in a format describing each respective user that originated the personal attribute information;
collecting, at the host computer, veracity feedback through the communications service from clients receiving the personal attribute information, the veracity feedback comprising users' opinions concerning veracity of the personal attribute information;
determining a veracity score expressing an estimated level of truth for individual items of the personal attribute information based on the veracity feedback, weighted according to reliability factors determined for users that provide the veracity feedback;
determining, at the host computer, a risk profile of each respective user that originated the personal attribute information in response to the veracity feedback,
determining the reliability factors based at least in part on consistency between feedback from each of the users and feedback from unrelated users regarding other personal attribute information;
serving the veracity score from the host computer to indicate a veracity estimate for items of the personal attribute information based on the users' opinions; and
serving the risk profile from the host computer to indicate a relative likelihood of truthfulness of the individual items of the personal attribute information based on the veracity feedback.

2. The method of claim 1, further comprising serving an interactive object from the host computer to the clients receiving the personal attribute information, the interactive object configured to enable collection of the veracity feedback.

3. The method of claim 2, wherein the interactive object comprises an interactive survey form configured to be accessed by a web browser.

4. The method of claim 1, further comprising:
determining physical-IP locations of client devices transmitting personal attribute information to a host computer using respective IP addresses of the client devices;
determine a measure of consistency between the physical-IP locations and respective individual locations identified by respective users originating the personal attribute information as describing the respective users' present geographic locations; and
determining the veracity score for the locations identified by the respective users based on the measure of consistency.

5. The method of claim 4, wherein determining the measure of consistency comprises makes use of a plurality of physical-IP locations determined at different times for respective ones of the users.

6. The method of claim 1, further comprising determining the reliability factors for users that provide the veracity feedback based on criteria including at least one of: a number of users providing the veracity feedback, veracity scores for personal attribute information of users providing the veracity feedback, length of time each user providing the veracity feedback has been an active member of the communications service, or amount of interactive activity with the communications service performed by each user providing the veracity feedback.

7. The method of claim 1, further comprising determining the reliability factors for users that provide the veracity feedback based on whether or not each user providing the veracity feedback has an identity verified by a third-party verification agent.

8. The method of claim 1, further comprising weighting the veracity score for individual items of the personal attribute information based on an extent to which the veracity feedback for the corresponding items of the personal attribute information are received in response to one or more interactive remote chat or video sessions between respective ones of the users that originated the personal attribute information and respective ones of the users providing the veracity feedback.

9. A non-transitory computer readable medium storing computer executable instructions that, if executed by a computer, cause the computer to perform a method comprising:
receiving from a first user of a social network application personal information items describing the first user;
requesting veracity feedback from a plurality of users of the social network application, the veracity feedback expressing opinions of the plurality of users concerning whether or not the personal information items received from the first user are true;
determining reliability factors comprising a reliability factor for each user providing the veracity feedback based at least in part on how often feedback the each user conflicts with veracity feedback from unrelated users;
determining a confidence score expressing an estimated level of truth for each item of personal information based on veracity feedback received in response to requesting the veracity feedback weighted according to the reliability factors;
determining a risk profile to indicate a relative likelihood of truthfulness of the personal information items based on the veracity feedback; and
publishing, using the social network application, the confidence score and the risk profile for the first user's personal information items to one or more users of the social network application.

10. The computer readable medium of claim 9, further storing computer executable instructions for determining the confidence score based on an extent to which the veracity feedback for the corresponding items of the personal information are received in response to one or more interactive remote chat or video sessions between the first user and respective ones of the users providing the veracity feedback.

11. The computer readable medium of claim 9, further storing computer executable instructions for serving an interactive object configured to enable collection of the veracity feedback from the plurality of users.

12. The computer readable medium of claim 9, further storing computer executable instructions for enabling the plurality of users to voluntarily submit the veracity feedback by interacting with an electronic form.

13. The computer readable medium of claim 9, further storing computer executable instructions for:

determining an physical-IP location of the first user based on an IP address for a client through which the first user is communicating with a host server;

comparing the physical-IP location with a location information provided by the first user; and determining a confidence score for the location information of the first user based on the comparison.

14. The computer readable medium of claim 13, further storing computer executable instructions for determining the confidence score for the location information based on a plurality of comparisons using a plurality of physical-IP locations determined during different sessions with the first user.

* * * * *